United States Patent [19]

Grabowski

[11] Patent Number: 5,542,960
[45] Date of Patent: Aug. 6, 1996

[54] EFFICIENT DIESEL FUEL ANTIFOAMS OF LOW SILICON CONTENT

[75] Inventor: Wojciech Grabowski, Gland, Switzerland

[73] Assignee: OSi Specialties, Inc., Danbury, Conn.

[21] Appl. No.: 283,291

[22] Filed: Jul. 7, 1994

Related U.S. Application Data

[63] Continuation of Ser. No. 86,009, Jun. 30, 1993, abandoned.

[30] Foreign Application Priority Data

Jun. 30, 1993 [CH] Switzerland ............ 08/086009

[51] Int. Cl.$^6$ ..................... C10L 1/28
[52] U.S. Cl. ............ 44/320; 528/29; 556/445; 556/456
[58] Field of Search ............ 44/320; 528/29; 556/445, 456

[56] References Cited

U.S. PATENT DOCUMENTS

| | | | |
|---|---|---|---|
| 2,724,698 | 11/1955 | Kittleson | 44/320 |
| 3,233,986 | 2/1966 | Morehouse . | |
| 3,384,600 | 5/1968 | Domba | 44/320 |
| 4,430,235 | 2/1984 | Chu et al. . | |
| 4,460,380 | 7/1984 | Rehrer | 44/320 |
| 4,690,688 | 9/1987 | Adams . | |
| 4,854,938 | 8/1989 | Easton | 44/320 |
| 4,996,277 | 2/1991 | Bradshaw et al. . | |
| 5,070,112 | 12/1991 | Grabowski . | |

FOREIGN PATENT DOCUMENTS

| | | |
|---|---|---|
| 0167361 | 1/1986 | European Pat. Off. . |
| 0193815 | 9/1986 | European Pat. Off. . |
| 0290163 | 11/1988 | European Pat. Off. . |
| 985633 | 3/1951 | France . |
| 2579481 | 3/1986 | France . |
| 707906 | 4/1954 | United Kingdom . |
| 8605411 | 9/1986 | WIPO . |

OTHER PUBLICATIONS

Union Carbide Chemicals and Plastics Company, Inc. Product Brochure for SILWET Surfactants, 1992.

*Primary Examiner*—Jacqueline V. Howard
*Attorney, Agent, or Firm*—Andrew S. Reiskind

[57] ABSTRACT

The present invention is a class of organosilicone terpolymers which may be used to abate the foaming of diesel fuel at silicon levels below 1.2 ppm. Said silicone terpolymers are modified alkyl phenol derivatives and polyethers grafted on a polysiloxane copolymer. Said polysiloxane terpolymer has a structure of $MD_xD^*_yD^{**}_2M$, where M is $O_{0.5}Si(CH_3)_3$, D is a $OSi(CH_3)_2$, $D^*$ is $OSi(CH_3)R$, R is a polyether, $D^{**}$ is $OSi(CH_3)R'$, R' is a phenol derivative $x+y+z$ is 35–350, $x/(y+z)$ is 3 to 6 and y/z is 0.25 to about 9.0.

20 Claims, 1 Drawing Sheet

2

EFFICIENT DIESEL FUEL ANTIFOAMS OF LOW SILICON CONTENT

BACKGROUND OF THE INVENTION

This application is a continuation of U.S. patent application Ser. No. 08/086,009 filed on Jun. 30, 1993, now abandoned.

Diesel fuel, (a mixture of a variety of hydrocarbons, mainly aliphatic, but in which aromatics may be present at up to twenty to twenty-five weight percent of the fuel), which also includes kerosine or gas oil, and which is commonly used in motor vehicles, has a tendency to foam profusely when it is poured into the fuel tank of a motor vehicle. It is therefore desirable to reduce such foaming, which can be accomplished by the addition of a defoamer. Currently, defoamers comprise organosilicone copolymers with the silicon (Si) content present at about 8–16 weight percent. Said defoamers have been added at about 10 to 20 parts per million (ppm) to the diesel fuel. Thus, the amount of silicon introduced to the engine system of the motor vehicle has been at 0.80 to 1.20 ppm; however, satisfactory performance has been achieved only at a silicon concentration of at least 1.2 ppm.

Motor vehicle manufacturers have found that this level of silicon in the engine system has a negative impact on the vehicle performance. Some difficulties which this silicon level presents are clogging the fuel filter, forming deposits on fuel injectors and the sedimentation of sludge in the fuel tank. Moreover, oil companies treat diesel fuel with organic additives, such as detergents, cetane improvers, viscosity breakers and occasionally perfumes (collectively referred to as "DAP"). Each oil company has its own preferred DAP which it typically uses only for mixing with its own fuel. All of these organic additives must be compatible with the defoamer, which is more difficult to achieve with defoamers with a relatively high silicon content.

Diesel fuels delivered to filling stations also may contain some amount of dispersed or dissolved water which can adversely affect the performance characteristics of previously known defoamers. The water causes a decay in defoaming characteristics and in some extreme cases, may cause the defoamer to enhance foaming, rather than suppress it. Such wet defoamers also can result in increased sludge deposition in the fuel tank.

U.S. Pat. No. 4,690,688 issued to Adams et al. discloses a typical prior art polysiloxane for use as a defoamer, wherein the polysiloxane is a copolymer with polyether unsaturated side chains that provide at least 25 weight percent of the copolymer. Said material contains about 16 weight percent silicon. Also known in the prior art are commercially available defoamers of silicone of the family of copolymers of $Me_3Si(OSiMe_2)_x(OSiMeR)_yOSiMe_3$, wherein R is $(CH_2)_3(OCH_2CH_2)_nOMe$, x is about 15, y is on average 5.5 and n is on average 7.5. Said material contains about 18 weight percent silicon. Both of these agents are added to diesel fuel at about 15 ppm, thus resulting in the lowest previously known level of silicon which functions as an antifoam of about 1.2 ppm.

Such polysiloxanes function by being partially soluble in diesel fuel and by decreasing the surface tension of the diesel fuel. The dimethyl siloxane groups ($Me_2SiO$) lower the surface energy of the fuel, while the ether side chains ensure that the solubility of polysiloxane copolymer in the fuel is reduced. However, these polysiloxane copolymers do not work well in wet diesel fuel because the ethers, as a hydrophilic material, will tend to stabilize the foaming of wet fuel. Additionally, to function properly these polysiloxanes must be present at levels in diesel fuel above those desirable in engine systems.

SUMMARY OF THE INVENTION

The present invention is a class of organosilicone terpolymers which may be used to abate the foaming of diesel fuel at a silicon level below 1.2 ppm. Said silicone terpolymers are modified alkyl phenol derivatives and polyethers grafted on a polysiloxane copolymer. The polysiloxane terpolymer has a structure of $MD_xD^*_yD^{**}_zM$ where M is $O_{0.5}Si(CH_3)_3$, D is a $OSi(CH_3)_2$, $D^*$ is $OSi(CH_3)R$, where R is a polyether, and $D^{**}$ is $OSi(CH_3)R'$, where R' is a phenol derivative. $x+y+z$ is from 35 to 350, $x/(y+z)$ is from 3 to 6 and $y/z$ is from 0.25 to about 9.0.

DETAILED DESCRIPTION OF THE INVENTION

Figure 1:
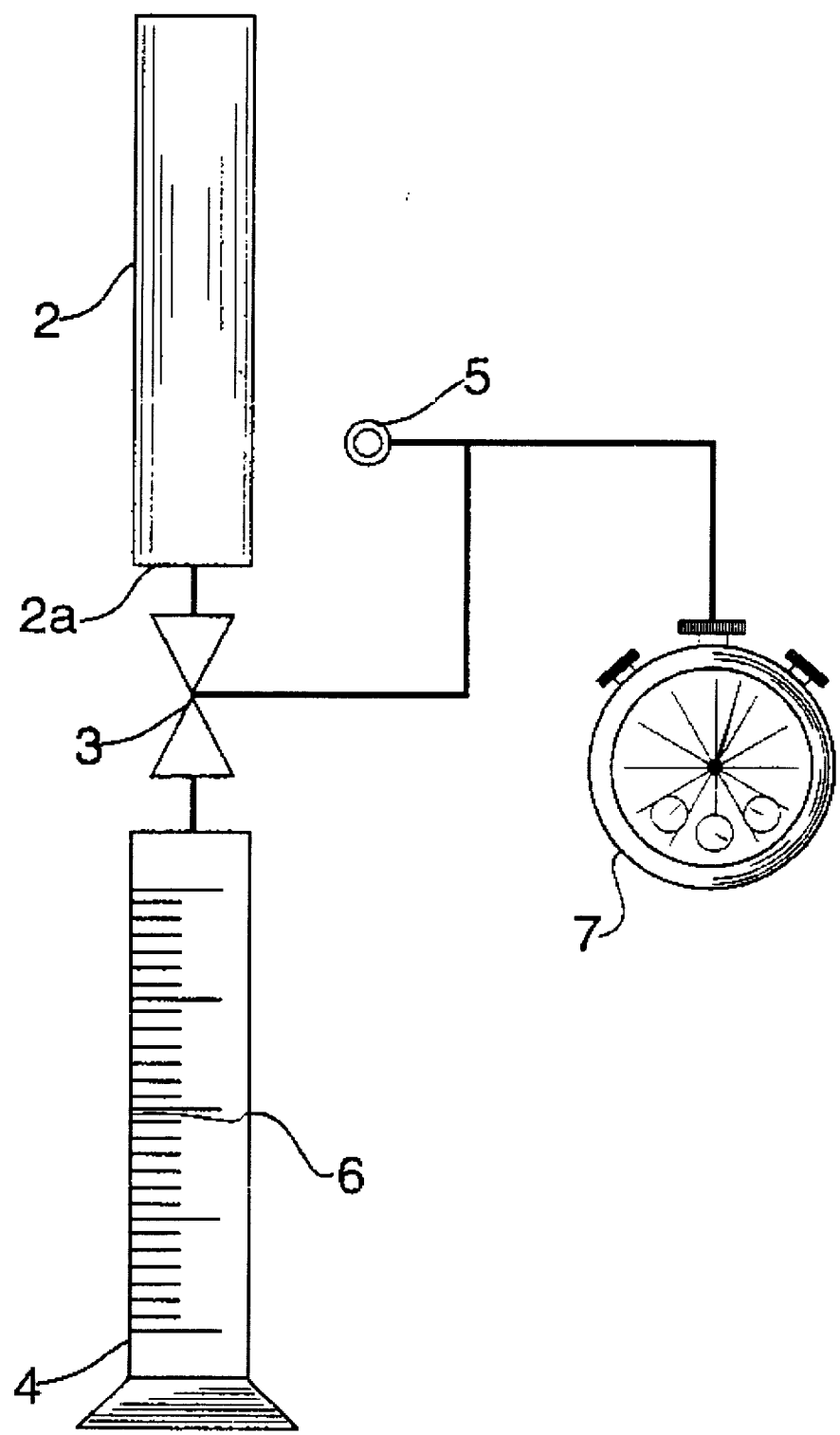
FIG. 1 is a device for testing the defoaming ability of an antifoam.

The present invention is directed to an organosilicone copolymer which may be used as a defoamer for diesel fuel. The copolymer described herein rectifies the deficiencies of those defoamers previously known in the art. The presently described copolymer offers high efficiency in defoaming diesel fuel at silicon contents lower than those previously known. Thus, one can expect the complete elimination or a substantial reduction of the problems presented by high silicone content defoamers, i.e., sludge deposition, fuel filter clogging and fuel injection line deposits. Moreover, the copolymers of the present invention demonstrate high stability in diesel fuel wherein water is dispersed or dissolved.

The advantages of the present invention are made possible by the cografting of phenol derivative substituents and polyethers onto a silicone backbone. Prior to the present invention, defoamers have used only polyether substitutions on a polysiloxane backbone. The substitution of phenol derivatives surprisingly improves the defoaming ability of the copolymer and lowers the total amount of silicon required. These highly efficient defoamers thus lower the total silicon levels in the final fuel. Moreover, since the phenol groups are more insoluble in water than the ethers, the copolymer functions better in wet diesel fuel.

COMPOSITION OF THE COPOLYMER

The class of organosilicone terpolymers of the present invention is polysiloxanes onto which both alkyl phenol derivatives and polyethers have been grafted. The introduction of phenolic moieties to copolymers, as compared to copolymers with polyethers as the sole grafted group, enhances defoaming efficiency and helps to maintain the performance characteristics of the terpolymers in diesel fuel wherein water is dispersed or dissolved.

These particular properties may be achieved by a careful selection of a siloxane backbone of the formula $MD_xD^*_yD^{**}_zM$ where M is terminal trimethoxysiloxy group, $O_{0.5}Si(CH_3)_3$, D is a polysiloxane building block, $OSi(CH_3)_2$, $D^*$ is $OSi(CH_3)R$, where R is a polyether, and $D^{**}$ is $OSi(CH_3)R'$, where R' is a phenol derivative. The structure may be represented as

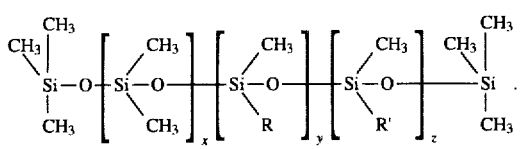

For terpolymers of the present invention x+y+z is in the range of about 35 to 350 and the ratio x/(y+z) is in the range of about 3 to 6. The preferred ranges for x+y+z is 90 to 150 and for x/(y+z) is 4.0 to 6.0. y/z is about 0.25 to about 9.0, with a preferred range being about 0.67 to 4.0.

By varying the total size of the copolymers, i.e., x+y+z, the ratio of siloxane groups, i.e., x/(y+z), and the nature of the grafted groups, R and R', one may design a copolymer for particular grades of fuels, particular engine systems and particular conditions of use. The ratio x/(y+z) defines the hydrophilic properties of the copolymer made of a given set of grafted groups and may be adjusted according to the water content of the fuel with which the copolymer is to be used.

Varying the molecular weight of the polysiloxane generally does not alter the polymer properties, but rather the upper limit of x+y+z is determined by the technological capability to handle very viscous silicon hydrides and the lower molecular weight limit is set by the fact that in smaller sized copolymers the distribution of modified groups may cause some copolymers to have no modified groups. The present ability has been limited x+y+z to about 35 to above 350, but if production ability improves copolymers outside of this range may be used.

Phenol derivatives are present at 10–80 mole percent of the grafted groups, more preferably present at 20–60 mole percent and most preferably present at 30 to 40 mole percent. Hence y/z should be about 0.25 to 9.0, preferably 0.67 to 4.0 and most preferably 1.5 to 2.33. Varying this ratio alters the ability of the terpolymer to control foam and affects how well the agent works in wet and dry diesel fuel.

The phenol derivative to be grafted has an unsaturated carbon side chain (olefinic) of 2 to 5 carbons long with which to graft onto the copolymer, e.g., 2-allyl phenol. The phenol derivative may optionally have other substituents on the benzene ring, e.g., a methoxy group. A typical example of a phenolic derivative to be grafted on the siloxane hydride starting material is eugenol (i.e., 4-allyl, 2-methoxyphenol), which is preferred because it is highly reactive in hydrosilylation, it is readily available and offers low health hazards.

The polyethers for use herein have molecular weights of less than about 4,000 grams/mole and preferably about 200 to 800 grams/mole. Preferably, one can use random or block adducts of ethylene and propylene oxides as the polyether with at least seventy-five (75) percent of the adducts being ethylene oxide. More preferably, the polyethers that are employed are ethylene oxide adducts on allyl alcohol and are represented by the formula: $CH_2=CHCH_2O(CH_2CH_2O)_nR'$ where R' is either a hydrogen, methyl group or an acetyl group and n is from 5 to 10. The most preferable polyether to be grafted is $CH_2=CHCH_2O(CH_2CH_2O)_7CH_3$.

The polysiloxane terpolymer should be added at about 2 ppm to about 10 ppm to the diesel fuel. This results in a silicon content of approximately 0.4 ppm to about 2.0 ppm of silicon. Preferably, a minimum amount of polysiloxane terpolymer is used and the preferred range of addition is at 2 ppm to 4 ppm, resulting in a silicon content of about 0.4 ppm to about 0.8 ppm, which is lower than previously known functional antifoams.

PREPARATION OF COPOLYMER

The main starting materials of the reaction are polysiloxane hydrides of the formula $MD_xD'_{y+z}M$, wherein x, y, z, D and M are as above, and D' are the reactive $OSi(CH_3)H$ groups which are the sites for grafting of the polyethers and phenolic derivatives. The D' units are transformed into $OSi(CH_3)R$ or $OSi(CH_3)R'$, where R and R' are as above, via a hydrosilylation process, which consists of reacting olefinic species with the silicon hydride moieties. Given the requirements, for x+y+z the starting polysiloxane should have 30–100 cc/gm active hydrogen (SiH), and preferably 40–70 cc/gm. The method of manufacture of these starting copolymers is well known in the art.

Additionally, the reactor must be charged with the polyethers and phenolic derivatives to be grafted. The relative amounts of phenol and ether to be added are determined as above and then an excess above the stoichiometrically required amounts necessary to react with all the active hydrogen (SiH) is added due to side reactions during the manufacture of the terpolymer of the present invention. Typically, 130% of the stoichiometric requirements of the phenol and ether are added.

Optionally, a solvent is added to ensure that the reactants are well mixed throughout the reaction. Solvents useful herein include, but are not limited to, DPG (dipropylene glycol) and toluene. The amount of solvent necessary depends on the reactor size and other reaction conditions.

A platinum catalyst is required for the hydrosilylation to proceed at a reasonable speed. Chloroplatinic acid dissolved in ethanol is preferred. The amount of catalyst required depends on the catalyst chosen and reaction conditions.

Buffers may be added to the reactor to prevent undesirable side reactions. Suitable buffers include sodium propionate and dibutylethanolamine. The buffer may be added at approximately 0.1 mole percent of the copolymer.

The reactor should be warmed to about 70° C. to about 90° C. The reaction is exothermic, but cooling the reactor is not necessary so long as the temperature remains within the desired range.

The reaction should be allowed to progress so that the hydrosilylation is complete and the active hydrogens have been replaced by the polyethers or the phenolic derivatives respectively. The reaction takes, depending on the temperature and the catalyst, about thirty minutes and may be monitored for hydrogen devolution to determine when complete. The reaction products should be allowed to cool and may be filtered if necessary and the solvent removed if desired.

For appropriate dosing, the terpolymer should be diluted to approximately 100 mg/100 gms of solution (1000 ppm). The solvents preferred for such a dilution are high aliphatic alcohols, such as ethylhexanol or isodecanol. Such a solution may be added directly to the diesel fuel or blended with other additives (e.g., DAP) to be dissolved in the diesel fuel.

EXAMPLES

Example 1

A nitrogen blanketed glass reactor at atmospheric pressure, which was equipped with a temperature probe, an agitator, a condenser and a nitrogen inlet, was charged with 37.0 gms of polysiloxane hydride of the general formula $MD_{100}D'_{19}M$ containing 60.5 cc/g of active hydrogen (0.10 moles of SiH), wherein M is a terminal trimethylsiloxy group, D is $(CH_3)_2SiO$ and D' is $OSi(CH_3)H$, 35.6 gms of polyether containing 8.7 weight percent of an allyl group and of the formula of $CH_2=CHCH_2O(CH_2CH_2O)_7CH_3$ (0.078 moles), 8.5 gms of high purity (98%) eugenol (0.052 moles), 81.1 gms of high purity dipropylene glycol (DPG) and 120 mgs of sodium propionate. The reaction mixture was warmed to 72° C. and platinum catalyst was introduced as 3.3% solution of chloroplatinic acid in ethanol, corresponding to 10 ppm of platinum. The reaction is exothermic and the reactor temperature rose to 84° C. within several minutes. The reaction was complete (i.e., the SiH was consumed) after 30 minutes. The copolymer was allowed to cool in the reactor for 30 minutes and then removed and filtered. The resulting polymer was of the structure $MD_{100}D^*_{19}D^{**}_8M$ wherein $D^*$ is $OSi(CH_3)CH_2CH_2CH_2O(CH_2CH_2O)_7OCH_3$ and $D^{**}$ is (2 methoxy-4-$(CH_2)_3SiO(CH_3)$phenol).

Examples 2–6

Several samples of copolymers were made according to the present invention and their antifoaming properties were tested using a test recommended by Elf Antar France. One hundred (100) cc of diesel fuel obtained from Shell Oil Co., 5 ppm of the defoaming agent and 200–300 ppm of a DAP package were placed in a 250 cc container and kept for one hour at 20° C. The mixture was placed in an experimental tester 1 as illustrated in FIG. 1. This mixture was then introduced to a glass tube 2 and pressurized to 0.4 to 0.6 bars. The glass tube 2 has a solenoid valve 3 in the bottom 2a which allows injection of the liquid in the tube into a graduated cylinder 4. Moreover, there is an infrared detector 5 which, when the fuel reaches a certain level 6 in the tube 2, causes the valve 3 to close and starts a stop watch 7. The initial foam volume in the graduated cylinder 4 and the time it takes for the foam to decay in said cylinder are measured. The initial volumes are not precise measures of the efficiency of a defoamer because reading the volume is difficult, especially for foam which collapses relatively quickly. Rather, the data is provided for comparative purposes. A good defoamer typically has an initial volume of about 110 cc to 130 cc of foam and liquid, while a blank (without a defoamer) typically has 220–240 cc of foam and liquid. A blank test (neat diesel fuel) was run at the beginning and the end of each experiment and the average decay time was 48–50 seconds with a standard deviation ($\sigma$) of 0.80 seconds.

The copolymers of the present invention which were tested had the compositions set forth in Table I below and were generally made according to the procedure set forth in Example I. The mole percentages set forth in Table I are percentages of the molar sum of the ether and phenol groups added to the reactor to produce the copolymer. The ether used for all copolymers was composed of seven ethylene oxide units ($CH_2$—$CH_2$—O) terminated with a methoxy ($CH_3O$) group. Copolymer E was made specifically as set forth in Example 1.

TABLE I

| Copolymers of the Present Invention | | | | |
|---|---|---|---|---|
| Copoly-mer | X + Y + Z | X/(Y + Z) | Mol. % ether | Mol % phenol |
| A | 97 | 4.7 | 80 | 20 (allylphenol) |
| B | 97 | 4.7 | 80 | 20 (eugenol) |
| C | 97 | 4.7 | 60 | 40 (eugenol) |
| D | 143 | 5.2 | 80 | 20 (allylphenol) |
| E | 119 | 5.3 | 60 | 40 (eugenol) |

The results of the tests of these copolymers as compared to copolymer X (made according to the teachings of U.S. Pat. No. 4,690,688) and XX (TP-303, commercially available from Union Carbide Corporation of Danbury, Conn.) are set forth in Table II below.

TABLE II

| Comparative Data for Dry, Fresh Diesel Fuel | | |
|---|---|---|
| Defoamer | Si conc. in fuel (ppm) | Relative Collapse Time (% of blank) |
| X | 1.20 | 45 |
| XX | 1.20 | 25 |
| A | 0.80 | 14 |
| B | 0.80 | 12 |
| C | 0.40 | 30 |
| D | 0.50 | 26 |
| E | 0.64 | 18 |

*The average foam collapse time for fresh, untreated diesel fuel was 48–50 sec. Thus, the copolymers of the present invention provided better defoamers than those commercially available and with a lower amount of silicon present in the fuel.

Examples 7–10

A defoamer of the present invention was tested against a commercially available defoamer in wet diesel fuel. 1000 ppm of water was added to diesel fuel commercially available from Shell Oil Co., along with 200–300 ppm of DAP. A defoamer was then also added. The mixture was shaken for 15 minutes using Burrell model 75 shaker at maximum speed. The mixture was then allowed to stay for a period of time specified for each test. The procedure to test the effect of the defoamer on the fuel was used as for examples 2–6, except the results are recorded in absolute collapse time in Table III below. Copolymers XX and B are the same as those set forth in the above examples.

TABLE III

| Comparative Data For Aged, Wet Diesel Fuel | | | |
|---|---|---|---|
| Defoamer | Si conc. in fuel (ppm) | Time (Days) | Collapse Time (sec) |
| XX | 1.20 | 0 | 24 |
| XX | 1.20 | 16 | 25 |
| XX | 1.20 | 62 | 32 |
| B | 0.80 | 0 | 14 |
| B | 0.80 | 16 | 15 |
| B | 0.80 | 62 | 19 |

Again the polymers of the present invention provided a better defoaming agent than those of the prior art and at a lower silicon level.

I claim:

1. A diesel fuel defoaming agent comprising a polymer of the formula $MD_xD^*_yD^{**}_zM$ where M is $O_{0.5}Si(CH_3)_3$, D is a $OSi(CH_3)_2$, $D^*$ is $OSi(CH_3)R$, R is a polyether, $D^{**}$ is $OSi(CH_3)R'$, R' is a phenol derivative, x+y+z is 35–350, x/(y+z) is 3 to 6 and y/z is 0.25 to 9.0.

2. A composition according to claim 1 wherein the phenol derivative has a hydrocarbon side chain of two to five carbons in length.

3. A composition according to claim 1 wherein the phenol derivative is eugenol.

4. A composition according to claim 1 wherein x+y+z is in the range of 90 to 150.

5. A composition according to claim 1 wherein x/(y+z) is in the range of about 4.0 to 6.0.

6. A composition according to claim 1 additionally comprising diesel fuel wherein the defoaming agent is present at 2.0 to 10 ppm.

7. A composition according to claim 1 wherein y/z is 0.67 to 4.0.

8. A composition according to claim 1 wherein the polyether is comprised of ether monomers of which at least seventy-five percent of the ether monomers being ethylene oxide and has a molecular weight between 200 and 800 gms/moles.

9. A method of reducing foaming of diesel fuel comprising adding to diesel fuel a polysiloxane terpolymer of the formula $MD_xD^*_yD^{**}_zM$, where M is $O_{0.5}Si(CH_3)_3$, D is a $OSi(CH_3)_2$, $D^*$ is $OSi(CH_3)R$, R is a polyether, $D^{**}$ is $OSi(CH_3)R'$, R' is a phenol derivative, x+y+z is 35–350, x/(y+z) is 3 to 6 and y/z is 0.25 to about 9.0.

10. A method according to claim 12 wherein the phenol derivative has a hydrocarbon side chain of two to five carbons in length.

11. A method according to claim 12 wherein the phenol derivative is eugenol.

12. A method according to claim 12 wherein x+y+z is in the range of 90 to 150.

13. A method according to claim 12 wherein x/(y+z) is in the range of about 4.0 to 6.0.

14. A method according to claim 12 wherein the terpolymer is added at 2.0 to 10 ppm of the diesel fuel.

15. A method according to claim 12 wherein y/z is 0.67 to 4.0.

16. A method according to claim 12 wherein the polyether is comprised of ether monomers of which at least seventy-five percent of the ether monomers being ethylene oxide and has a molecular weight; between 200 and 800 gms/moles.

17. A method for reducing foaming in diesel fuel comprising:

adding polysiloxane polymer to diesel fuel so that the total silicon content of the fuel is between 0.4 ppm and 0.8 ppm to achieve a relative collapse time as compared to the untreated foam of less than 30%.

18. A method according to claim 17 wherein the polysiloxane polymer has the formula $MD_xD^*_yD^{**}_zM$ where M is $O_{0.5}Si(CH_3)_3$, D is a $OSi(CH_3)_2$, $D^*$ is $OSi(CH_3)R$, R is a polyether, $D^{**}$ is $OSi(CH_3)R'$, R' is a phenol derivative and x+y+z is 35–350, x/(y+z) is 3 to 6 and y/z is 0.25 to about 9.0.

19. A method according to claim 18 wherein the total silicon content in the fuel is in the range of 0.4 to 0.8 ppm of the diesel fuel.

20. A method according to claim 18 wherein the polyether is comprised of ether monomers of which at least seventy-five percent of the ether monomers being ethylene oxide and has a molecular weight between 200 and 800 gms/moles.

\* \* \* \* \*